US008872044B2

(12) United States Patent
Nice

(10) Patent No.: US 8,872,044 B2
(45) Date of Patent: Oct. 28, 2014

(54) CABLE HOLDER DEVICES, SYSTEMS, AND METHODS

(75) Inventor: Curtis A. Nice, Mabane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 13/571,139

(22) Filed: Aug. 9, 2012

(65) Prior Publication Data
US 2014/0041932 A1 Feb. 13, 2014

(51) Int. Cl.
H02G 3/18 (2006.01)
(52) U.S. Cl.
USPC .............. 174/668; 439/501; 439/450; 248/56
(58) Field of Classification Search
CPC ........................................ H02G 3/18
USPC .................. 174/668; 439/501, 502, 450, 650; 248/56
See application file for complete search history.

(56) References Cited

U.S. PATENT DOCUMENTS

| 2,742,624 A | 4/1956 | Stevens, Jr. |
| 3,366,356 A | 1/1968 | Fisher |
| 3,492,031 A | 1/1970 | Henning |
| 3,836,269 A | 9/1974 | Koscik |
| 3,889,909 A | 6/1975 | Koscik |
| 3,958,300 A * | 5/1976 | Tanaka .......................... 174/68.1 |
| 4,102,219 A | 7/1978 | Plamper |
| 5,257,763 A * | 11/1993 | Nakamura ...................... 248/56 |
| 7,607,369 B2 | 10/2009 | Cox et al. |

* cited by examiner

Primary Examiner — Dhirubhai R Patel
(74) Attorney, Agent, or Firm — Jenkins, Wilson, Taylor & Hunt, P.A.

(57) ABSTRACT

Devices, systems, and methods for protecting a cable from damage and holding the cable in position with respect to an opening in a machine deck can include a first body portion with a first channel portion configured to receive a cable, a second body portion with a second channel portion configured to receive the cable, a hinge connecting the first and second body portions, and one or more flange portions connected to the first and/or second body portions and configured to support the body portions on a surface of a machine deck such that the cable is positioned at a predetermined angle. The first and second body portions can be pivotable with respect to one another about the hinge between a closed position in which the first and second channel portions can be substantially aligned and an open position in which the channel portions can be separated from each other.

20 Claims, 6 Drawing Sheets

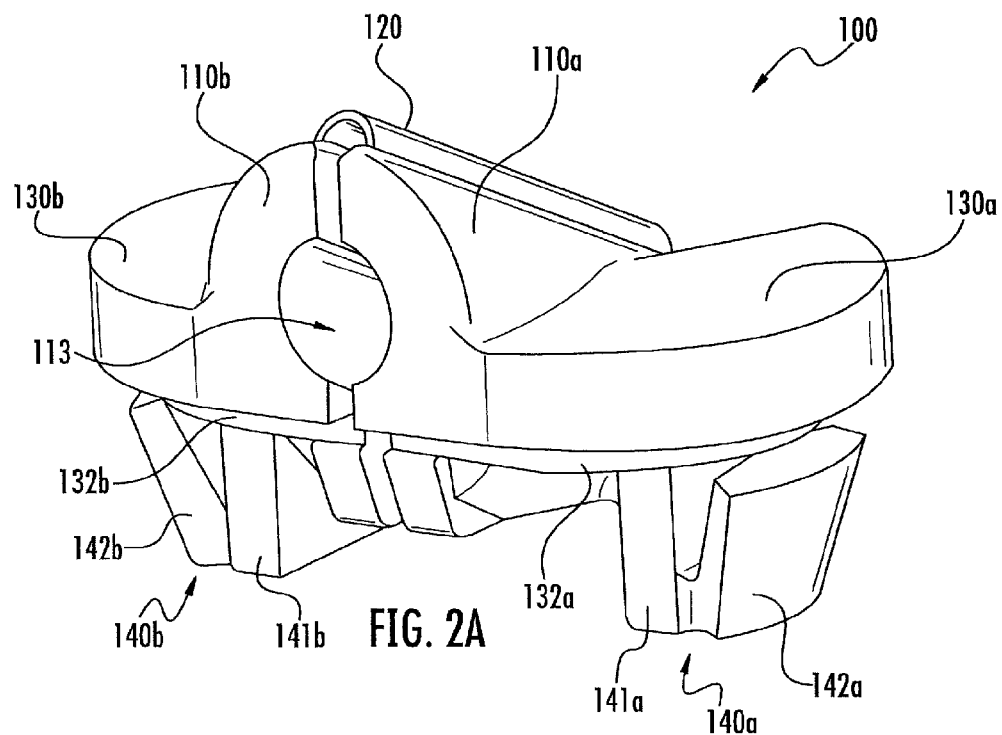
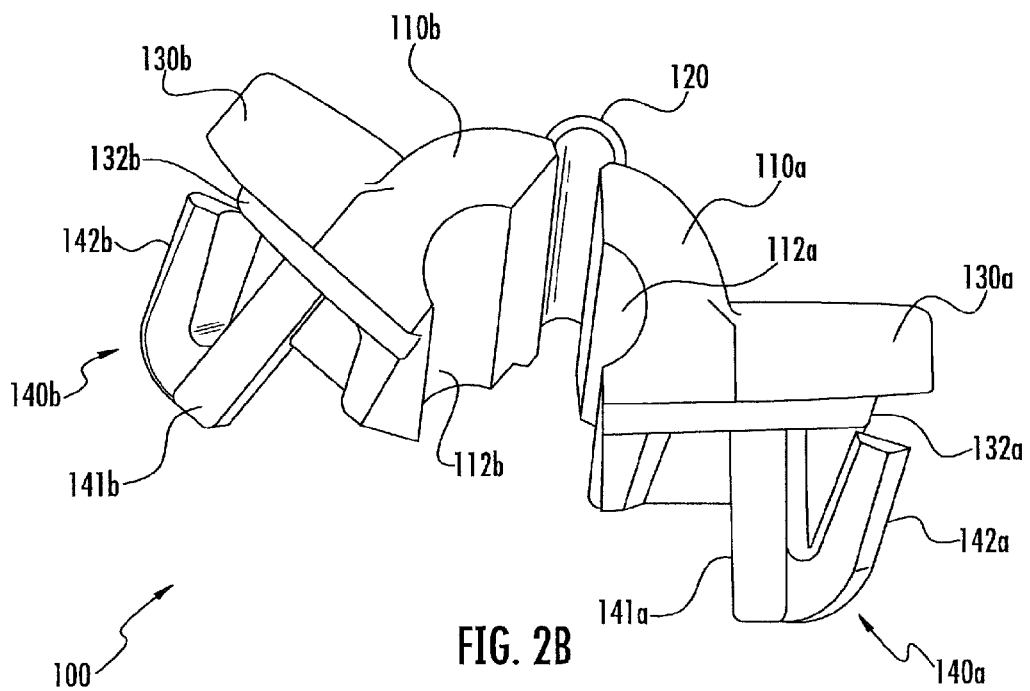

CABLE HOLDER DEVICES, SYSTEMS, AND METHODS

BACKGROUND

In powered equipment design, it is common for structural members constructed of metal or other hard materials to have holes made therein to allow for passage of cables, electrical wires, cords, or other relatively soft and/or vulnerable material there through. Such holes may have sharp edges, however, which can cause the vulnerable elements passing through the hole to become abraded or cut, or electrical insulation may break due to repeated flexing at the exit point. To address this issue, rubber, plastic, or plastic-coated metal grommets are commonly used to shield the vulnerable elements from such damage.

For example, as shown in FIGS. 1A and 1B, rubber grommets 10 are commonly used in openings O formed in a machine deck MD (e.g., a lawnmower deck) to provide a smooth transition for a cable C passing through machine deck MD. As shown in FIG. 1B, grommet 10 can be configured to snap into place within opening O in machine deck MD to maintain grommet 10 in position and to protect cable C from the sharp edges of opening O.

Although current rubber grommets, such as grommet 10 shown in FIGS. 1A and 1B, can provide some degree of protection from damage to cables and wires, these designs do not provide a defined direction for the cable, nor do they offer any clamping force to secure the cable in place. As a result, it would be desirable for devices, systems, and methods to hold a cable in position as it passes through a hole in a machine deck in addition to protecting the cable from damage.

SUMMARY

In accordance with this disclosure, devices, systems, and methods for protecting a cable from damage and holding the cable in position with respect to an opening in a machine deck are provided. In one aspect, a cable holder device for guiding a cable through an opening in a surface is provided. A cable holder device can, for example, comprise a first body portion comprising a first channel portion configured to receive a cable, a second body portion comprising a second channel portion configured to receive the cable, a hinge connecting the first body portion to the second body portion, and one or more flange portions connected to one or both of the first body portion or the second body portion. The first body portion and the second body portion can be pivotable with respect to one another about the hinge between a closed position in which the first channel portion is substantially aligned with the second channel portion and an open position in which the first channel portion is separated from the second channel portion. The one or more flange portions can be configured to support the first body portion and the second body portion on a surface of a machine deck such that the cable is positioned at a predetermined angle.

In another aspect, a system for guiding a cable through an opening in a surface can comprise a machine deck defining a top surface, a bottom surface, and an opening therethrough. The system can further comprise a cable holder device comprising a first body portion comprising a first channel portion configured to receive a cable, a second body portion comprising a second channel portion configured to receive the cable, a hinge connecting the first body portion to the second body portion, one or more flange portions connected to one or both of the first body portion or the second body portion, and one or more couplers configured to engage the bottom surface of the machine deck to hold one or both of the first body portion or the second body portion in a substantially fixed position with respect to the machine deck. The first body portion and the second body portion can be pivotable with respect to one another about the hinge between a closed position in which the first channel portion is substantially aligned with the second channel portion and an open position in which the first channel portion is separated from the second channel portion. The one or more flange portions can be configured to support the first body portion and the second body portion on the top surface of the machine deck at a predetermined angle.

In yet another aspect, a method for guiding a cable through a surface can comprise engaging a cable with a cable holder device and positioning the cable holder device in an opening in a machine deck, wherein the cable holder device can be supported on the machine deck such that the cable is positioned at a predetermined oblique angle.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 2A is a perspective view of a cable holder according to an embodiment of the presently disclosed subject matter;

FIG. 2B is a perspective view of the cable holder shown in FIG. 2A positioned in an "OPEN" state for receiving a cable therein;

DETAILED DESCRIPTION

Figure 1A:
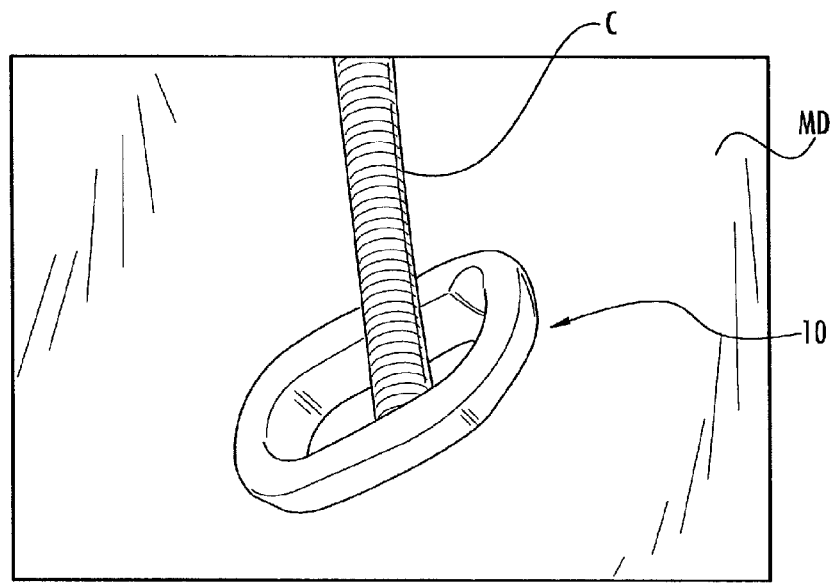
FIGS. 1A and 1B are perspective views of a grommet used for cable protection according to a prior art configuration.
Figure 1B:
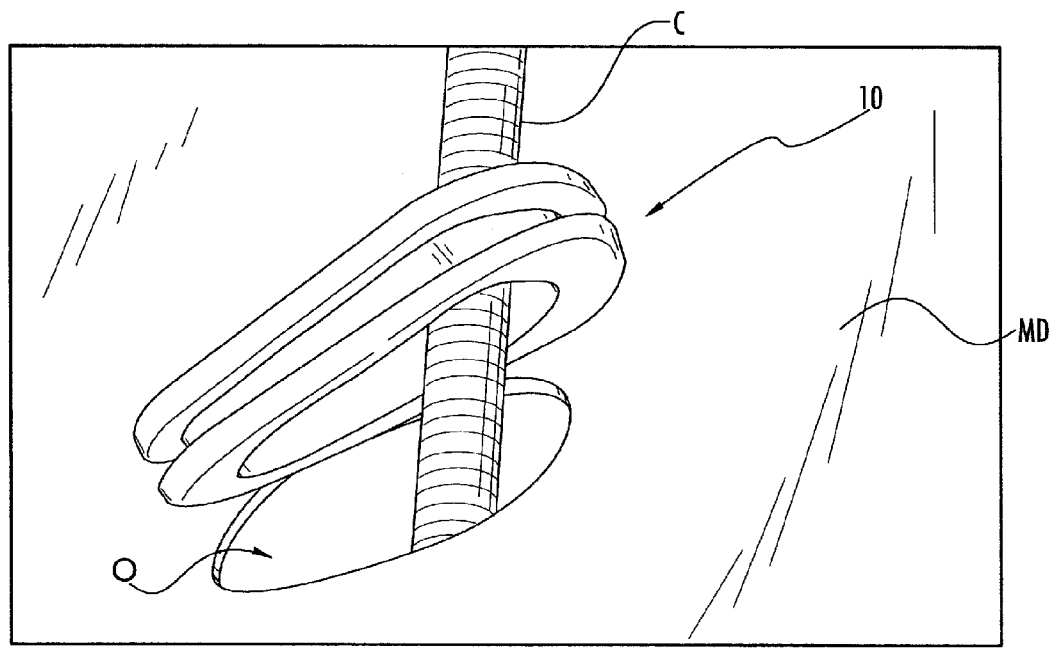

The present subject matter provides devices, systems, and methods for protecting a cable from damage and holding the cable in position with respect to a hole in a machine deck. In one aspect, the present subject matter provides a mid-cable clamp-on deck transition fitting for guiding a cable through an opening in a surface. For instance, referring to FIGS. 2A through 6, a cable holder device, generally designated 100, can comprise a first body portion, generally designated 110a, and a second body portion, generally designated 110b, connected by a hinge, generally designated 120. First body portion 110a can comprise a first channel portion 112a, and second body portion 110b can comprise a complementary second channel portion 112b, wherein first channel portion 112*a* and second channel portion 112*b* can be aligned to define two sections of a substantially cylindrical channel 113.

As shown in FIG. 2B, hinge 120 can be a living hinge composed of a plastic (e.g., a nylon such as PA 6 or PA 66) or other material that is able to flexibly connect first body portion 110*a* to second body portion 110*b*. Hinge 120 can be connected to first body portion 110*a* along an edge of first body portion 110*a* that is substantially parallel to first channel portion 112*a*, and it can be connected to second body portion 110*b* along an edge of second body portion 110*b* that is substantially parallel to second channel portion 112*b*. Regardless of the specific configuration, hinge 120 can be designed such that first body portion 110*a* and second body portion 110*b* are pivotable with respect to one another about hinge 120 between a closed position in which first channel portion 112*a* is substantially aligned with second channel portion 112*b* (See, e.g., FIG. 3B) and an open position in which first channel portion 112*a* is separated from second channel portion 112*b* (See, e.g., FIG. 2B). In particular, hinge 120 can be designed and configured to be biased towards the open position. For example, hinge 120 can be configured such that first body portion 110*a* and second body portion 110*b* are spaced apart by a predefined angle (e.g., about 45 degrees as shown in FIG. 2B) when in an unstressed state. The predefined angle can be selected such that it is large enough that cable holder device 100 can be readily manufactured (e.g., by molding), yet small enough that even with repeated flexures between the open and closed positions, hinge 120 can have a long service life.

With such a configuration, a cable C can be positioned between first body portion 110*a* and second body portion 110*b*, and first body portion 110*a* and second body portion 110*b* can be pivoted with respect to one another to enclose cable C between first channel portion 112*a* and second channel portion 112*b*. In other words, first body portion 110*a* and second body portion 110*b* can be moved with respect to one another to the closed position such that cable C is secured within channel 113. Specifically, where hinge 120 is connected to first body portion 110*a* along an edge of first body portion 110*a* and to second body portion 110*b* along an edge of second body portion 110*b* as discussed above, it can be relatively easy for a user to pinch the two halves of cable holder device 100 together onto cable C without a need for a separate alignment step. Specifically, referring to FIGS. 2A through 3A, hinge 120 can be connected to each of first body portion 110*a* and second body portion 110*b* along substantially the entire length of each body portion such that the relative movement of first body portion 110*a* with respect to second body portion 110*b* is substantially limited to rotation about hinge 120. In addition, having hinge 120 being configured to be biased towards an open or semi-open position (e.g., first body portion 110*a* and second body portion 110*b* being spaced apart about 45 degrees) can also make it easy to pinch cable C between first body portion 110*a* and second body portion 110*b* and insert it into channel 113.

Cable holder device 100 can be configured to rest at or within opening O of machine deck MD. For example, opening O can comprise an elongated slot (e.g., 17 mm×30 mm) formed through machine deck MD (e.g., a 1.5 mm-thick steel plate). Thus, when cable C is positioned between first channel portion 112*a* and second channel portion 112*b*, cable holder device 100 can be configured to surround and secure cable C in place with respect to machine deck MD. For example, where it is desired to pass a ³⁄₁₆" diameter cable commonly used in the art through machine deck MD, first channel portion 112*a* and second channel portion 112*b* can be sized such that channel 113 formed by their union has a diameter 115 (See, e.g., FIG. 3B) that is equal to or at least marginally larger than ³⁄₁₆" (e.g., about 5 to 6 mm). To allow some flexibility in the size of cable C, hinge 120 can be configured such that even in the closed position (i.e., with first channel portion 112*a* and second channel portion 112*b* substantially aligned with one another), first body portion 110*a* and second body portion 110*b* can remain separated by a gap 116 (See, e.g., FIG. 3B) that allows for small variations (e.g., about 1 to 1.5 mm) in the spacing between first body portion 110*a* and second body portion 110*b*.

To help support and maintain cable holder device 100 in a desired position within opening O, cable holder device 100 can comprise one or more flange portions configured to support first body portion 110*a* and second body portion 110*b* on a surface of machine deck MD such that cable C is positioned at a predetermined angle. For example, referring again to FIGS. 2A and 2B, cable holder device 100 can comprise a first flange portion 130*a* connected to first body portion 110*a* and a second flange portion 130*b* connected to second body portion 110*b*. In this configuration, when first body portion 110*a* and second body portion 110*b* are positioned in a closed position (i.e., with first channel portion 112*a* and second channel portion 112*b* aligned to define channel 113), first flange portion 130*a* and second flange portion 130*b* can be aligned to substantially surround first body portion 110*a* and second body portion 110*b* and serve as a bearing surface that can support cable holder device 100 on machine deck MD.

Figure 3A:
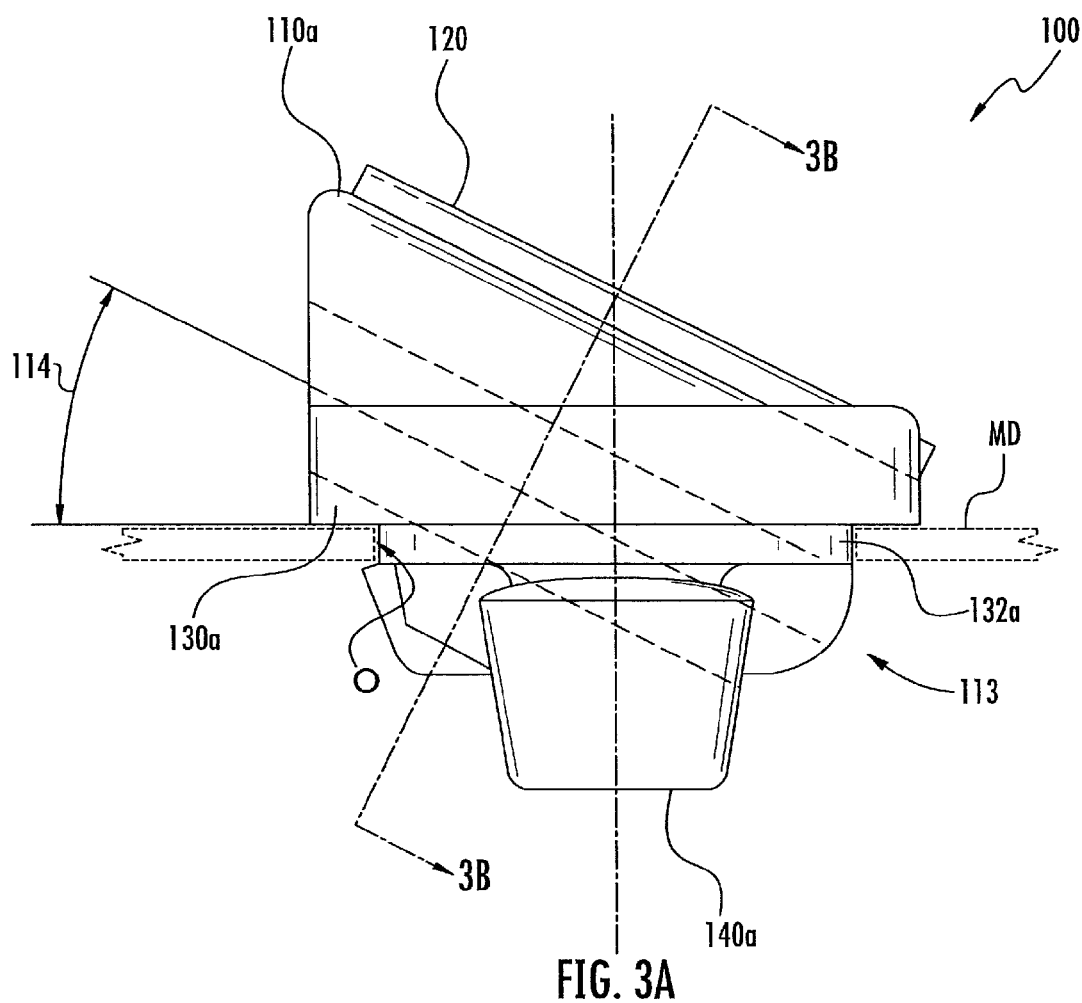
FIG. 3A is a side view of a cable holder according to an embodiment of the presently disclosed subject matter.
Figure 3B:
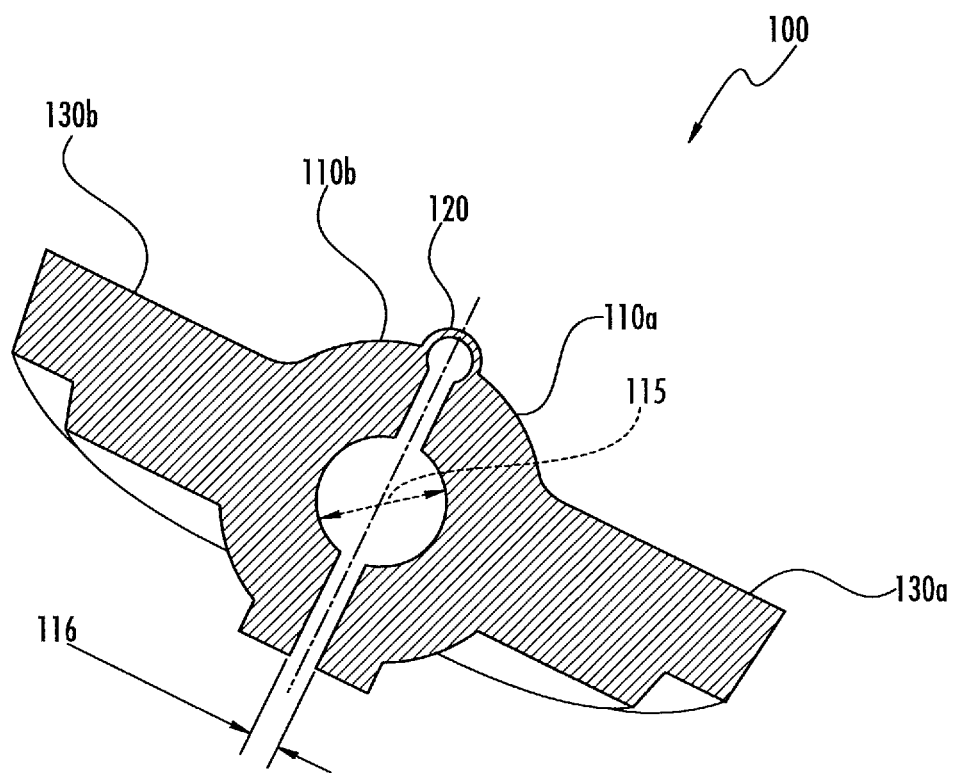
FIG. 3B is a cross-sectional front view of the cable holder shown in FIG. 3A.
Figure 4:
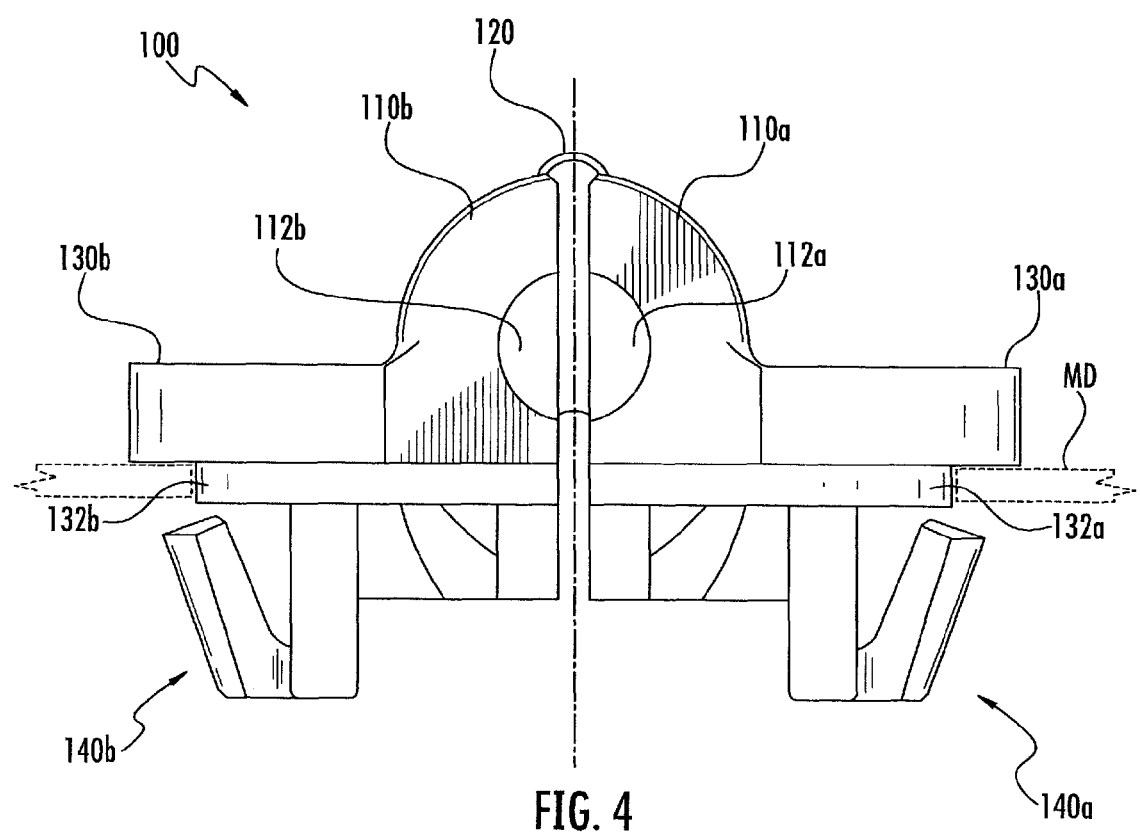
FIG. 4 is a front view of a cable holder according to an embodiment of the presently disclosed subject matter.
Figure 5:
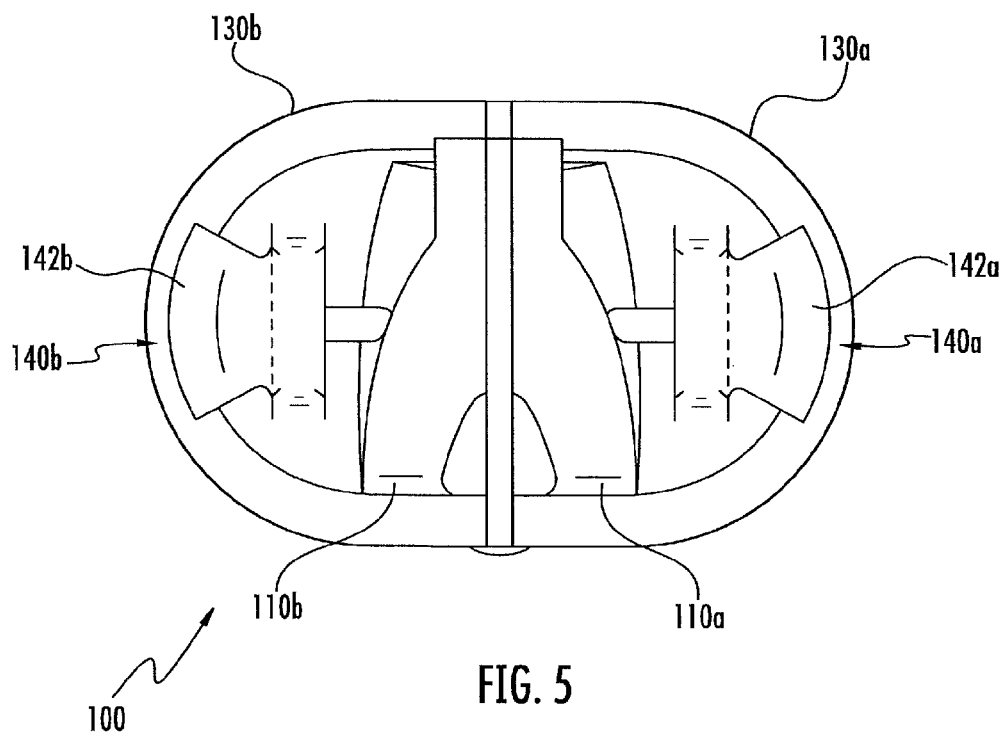
FIG. 5 is a bottom view of a cable holder according to an embodiment of the presently disclosed subject matter.
Figure 6:
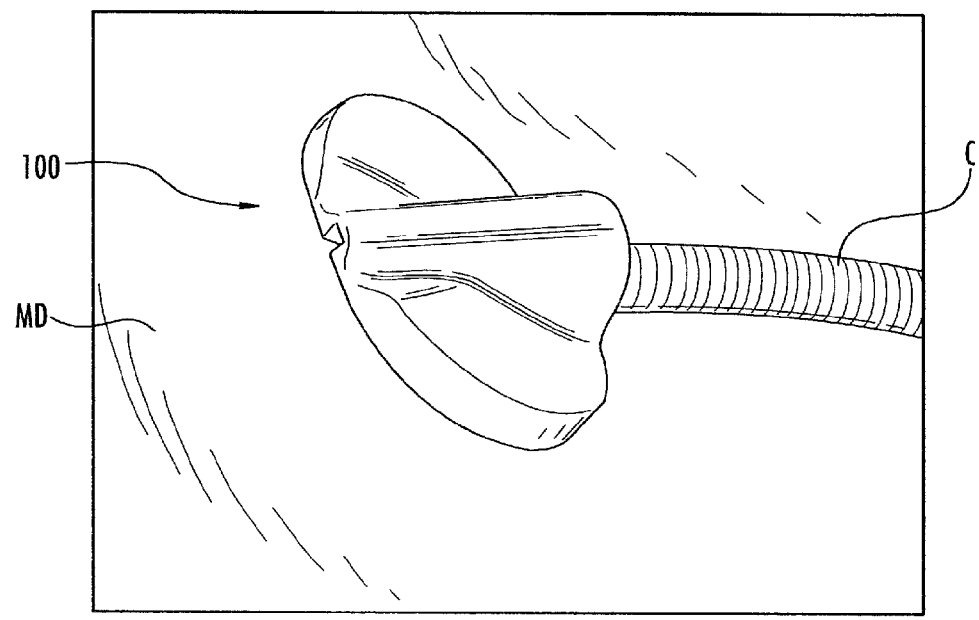
FIG. 6 is a perspective view of a cable holder positioned with respect to a cable passing through a machine surface according to an embodiment of the presently disclosed subject matter.

In particular, referring to FIG. 3A, first flange portion 130*a* and second flange portion 130*b* can be connected to first body portion 110*a* and second body portion 110*b*, respectively, such that channel 113 is oriented at a desired channel angle 114 with respect to first flange portion 130*a* and second flange portion 130*b*. For example, channel angle 114 can be selected to be an oblique angle (i.e., at an angle that is neither parallel nor at a right angle to the planar surface of the flange portion) of about 30 degrees or less as shown in FIG. 3A. Regardless of the specific angle, cable holder device 100 can be configured so that when cable C is positioned within channel 113, it can maintain a relatively low profile with respect to machine deck MD without bending excessively at the junction through which cable C passes through machine deck MD. (See, e.g., FIG. 6) In this arrangement, both the alignment and position of cable C can be controlled, which can in turn reduce wear on cable C, on machine deck MD, and on related parts.

To further support cable holder device 100 in a desired position on machine deck MD, the one or more flange portions (e.g., first flange portion 130*a* and second flange portion 130*b*) can be configured to define a seat to at least partially engage an edge of opening O in machine deck MD. Specifically, as shown in FIGS. 2A and 2B, the seat can comprise a first seat portion 132*a* extending from a surface of first flange portion 130*a* and a second seat portion 132*b* extending from a surface of second flange portion 130*b*. First seat portion 132*a* and second seat portion 132*b* can be shaped, sized, or otherwise configured to substantially match the shape of at least a portion of opening O. As shown in FIG. 3A, for example, first seat portion 132*a* (and likewise second seat portion 132*b*) can be sized and shaped to abut the edges of and substantially fill at least a portion of opening O. In this way, cable holder device 100 can be maintained in a desired position and orientation within opening O. In addition, where hinge 120 is configured to bias first body portion 110*a* and second body portion 110*b* apart from each other, when cable holder device 100 is inserted into opening O, such a biasing force can cause first seat portion 132*a* and second seat portion 132*b* to press against opposing sidewalls of opening O, thereby further securing cable holder device 100 in position.

Furthermore, in addition to holding cable holder device 100 in a desired position on machine deck MD, one or more of first flange portion 130a, second flange portion 130b, first seat portion 132a and second seat portion 132b can act as a seal to keep debris from passing through opening O into machine deck MD.

One or more coupling mechanisms can also be used to engage machine deck MD to hold one or both of first body portion 110a or second body portion 110b in a substantially fixed position with respect to machine deck MD. Specifically, for example, a first coupler 140a can be connected to first body portion 110a and a second coupler 140b can be connected to second body portion 110b. In the particular configuration shown in FIGS. 2A through 5, for example, first coupler 140a can comprise a first post 141a having a first end that is connected to first body portion 110a and a second end opposite the first end from which a first locking tab 142a extends. Likewise, second coupler 140b can comprise a second post 141b connected to second body portion 112b and a second locking tab 142b connected to second post 141b.

First locking tab 142a and second locking tab 142b can be flexibly (e.g., elastically) connected to first post 141a and second post 141b, respectively, and can extend away from their respective posts in substantially opposing directions with respect to a center of cable holder device 100. (See, e.g., FIGS. 4 and 5) In this configuration, cable holder device 100 can be coupled with machine deck MD by inserting first coupler 140a and second coupler 140b into opening O in machine deck MD. As first coupler 140a and second coupler 140b are inserted into opening O, first locking tab 142a and second locking tab 142b can flex inwardly (i.e., towards a center of cable holder device 100) so that they can pass through opening O. Once first locking tab 142a and second locking tab 142b are inserted completely through opening O, they can spring away from first post 141a and second post 141b, respectively. In this position, first locking tab 142a and second locking tab 142b can brace against a "bottom" surface of mower deck MD (i.e., a surface of mower deck MD opposite the surface against which first flange portion 130a and second flange portion 130b can be configured to engage). In this way, first coupler 140a and second coupler 140b can resist efforts to remove cable holder device 100 from its position on mower deck MD. To remove cable holder device 100 from this position, first locking tab 142a and second locking tab 142b can be pushed inwardly so that they lie within the footprint of opening O, and cable holder device 100 can be lifted back through opening O.

The present subject matter can be embodied in other forms without departure from the spirit and essential characteristics thereof. The embodiments described therefore are to be considered in all respects as illustrative and not restrictive. This written description uses examples to disclose the subject matter, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cable holder device for guiding a cable, the cable holder device comprising:
   a first body portion comprising a first channel portion configured to receive a cable;
   a second body portion comprising a second channel portion configured to receive the cable;
   a hinge connecting the first body portion to the second body portion, wherein the first body portion and the second body portion are pivotable with respect to one another about the hinge between a closed position in which the first channel portion is substantially aligned with the second channel portion and an open position in which the first channel portion is separated from the second channel portion; and
   one or more flange portions connected to one or both of the first body portion or the second body portion, the one or more flange portions being aligned with respect to the first body portion and the second body portion such that the first channel portion and the second channel portion are positioned at a predetermined oblique angle with respect to a planar surface of the one or more flange portions.

2. The cable holder device of claim 1, wherein the hinge comprises a living hinge.

3. The cable holder device of claim 1, wherein the hinge is connected to the first body portion along an edge of the first body portion that is substantially parallel to the first channel portion; and
   wherein the hinge is connected to the second body portion along an edge of the second body portion that is substantially parallel to the second channel portion.

4. The cable holder device of claim 1, wherein the hinge is configured to bias the first body portion and the second body portion towards the open position in which the first channel portion is separated from the second channel portion.

5. The cable holder device of claim 4, wherein the hinge is configured to bias the first body portion and the second body portion towards a position in which the first channel portion is separated from the second channel portion by an angle of about 45 degrees.

6. The cable holder device of claim 1, wherein the one or more flange portions are configured to support the first body portion and the second body portion on a surface of a machine deck such that the first channel portion and the second channel portion are oriented at an angle of about 30 degrees or less with respect to the surface of the machine deck.

7. The cable holder device of claim 1, wherein the one or more flange portions comprise a first flange portion connected to the first body portion and a second flange portion connected to the second body portion.

8. The cable holder device of claim 1, wherein the one or more flange portions comprise a seat configured to at least partially engage an edge of an opening in a machine deck.

9. The cable holder device of claim 1, comprising one or more couplers configured to engage a machine deck to hold one or both of the first body portion or the second body portion in a substantially fixed position with respect to the machine deck.

10. The cable holder device of claim 9, comprising a first coupler connected to the first body portion and a second coupler connected to the second body portion.

11. The cable holder device of claim 1, comprising a first coupler connected to the first body portion and a second coupler connected to the second body portion, the first coupler and the second coupler configured to engage a machine deck to hold the first body portion and the second body portion in a substantially fixed position with respect to the machine deck, the first coupler and the second coupler each comprising a post connected to one of the first body portion and the second body portion, respectively, and the first coupler and the second coupler each comprising a locking tab that extends away from the post.

12. A system for guiding a cable through an opening in a surface, the system comprising:
a machine deck defining a top surface, a bottom surface, and an opening therethrough; and
a cable holder device comprising:
a first body portion comprising a first channel portion configured to receive a cable;
a second body portion comprising a second channel portion configured to receive the cable;
a hinge connecting the first body portion to the second body portion, wherein the first body portion and the second body portion are pivotable with respect to one another about the hinge between a closed position in which the first channel portion is substantially aligned with the second channel portion and an open position in which the first channel portion is separated from the second channel portion;
one or more flange portions connected to one or both of the first body portion or the second body portion, the one or more flange portions being aligned with respect to the first body portion and the second body portion on the top surface of the machine deck such that the first channel portion and the second channel portion are positioned at a predetermined oblique angle with respect to a planar surface of the one or more flange portions; and
one or more couplers configured to engage the bottom surface of the machine deck to hold one or both of the first body portion or the second body portion in a substantially fixed position with respect to the machine deck.

13. The system of claim 12, wherein the one or more flange portions are configured to support the first body portion and the second body portion on the surface of the machine deck such that the first channel portion and the second channel portion are positioned at an angle of about 30 degrees or less with respect to the planar surface of the one or more flange portions.

14. The system of claim 12, wherein the one or more flange portions comprise a first flange portion connected to the first body portion and a second flange portion connected to the second body portion.

15. The system of claim 12, wherein the one or more flange portions comprise a seat configured to at least partially engage an edge of the opening in the machine deck.

16. The system of claim 12, comprising a first coupler connected to the first body portion and a second coupler connected to the second body portion.

17. A method for guiding a cable, the method comprising: positioning a cable in a channel formed between a first body portion and a second body portion of a cable holder device, the first body portion and the second body portion being connected by a hinge; positioning the cable holder device in an opening in a machine deck, wherein the cable holder device is supported on the machine deck one or more flange portions connected to one or both of the first body portion or the second body portion, the one or more flange portions being aligned with respect to the first body portion and the second body portion such that the channel is positioned at a predetermined oblique angle with respect to the machine deck.

18. The method of claim 17, wherein positioning the cable holder device in an opening in the machine deck comprises positioning the cable holder such that the channel is positioned at an angle of about 30 degrees or less with respect to the machine deck.

19. The method of claim 17, comprising securing the cable holder device in place in the opening in the machine deck.

20. The method of claim 17, wherein securing the cable holder device in place comprises engaging one or more couplers with the machine deck.

* * * * *